United States Patent Office 3,397,292
Patented Aug. 13, 1968

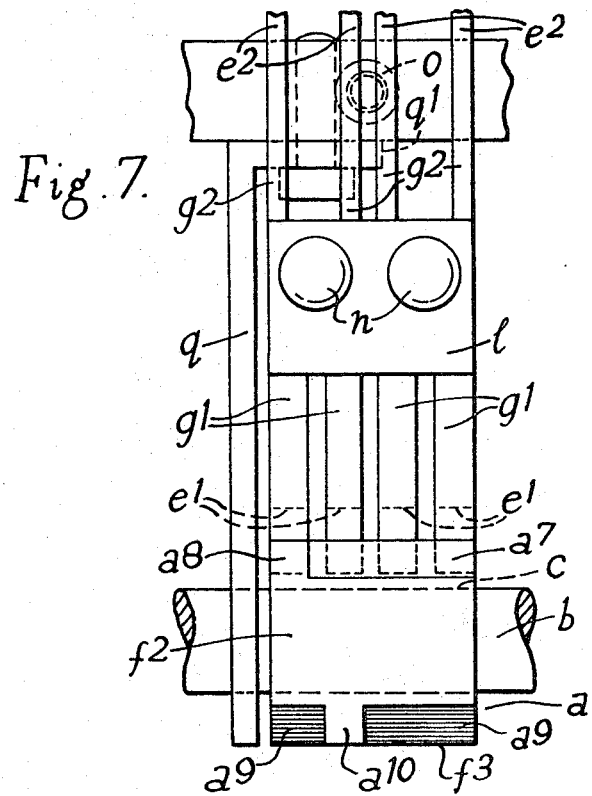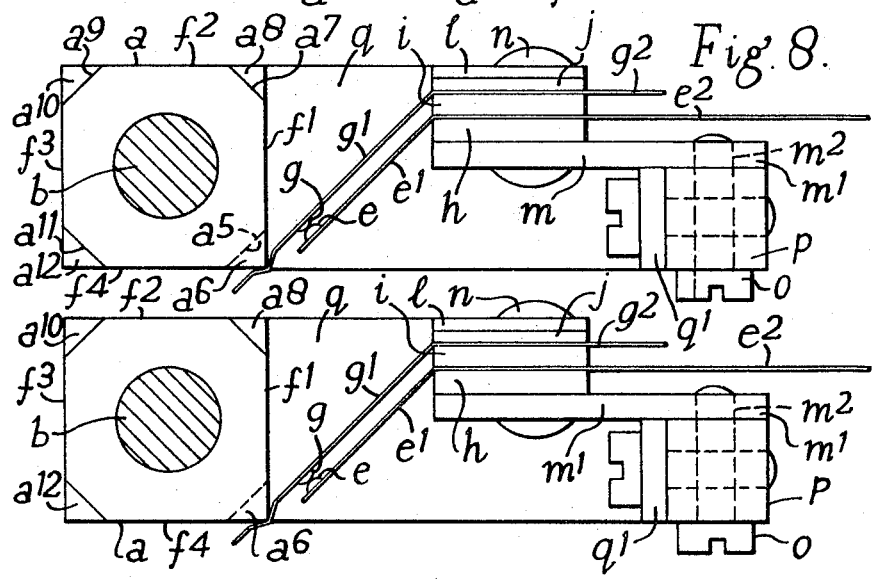

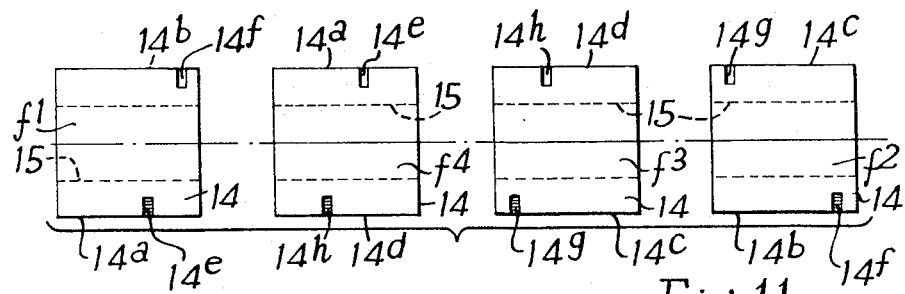
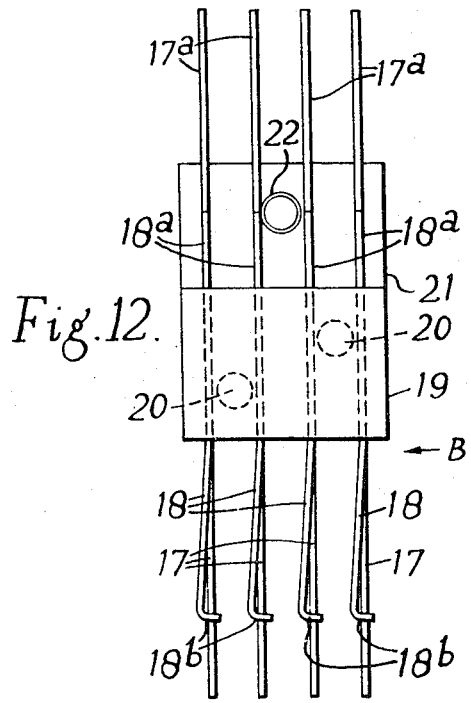
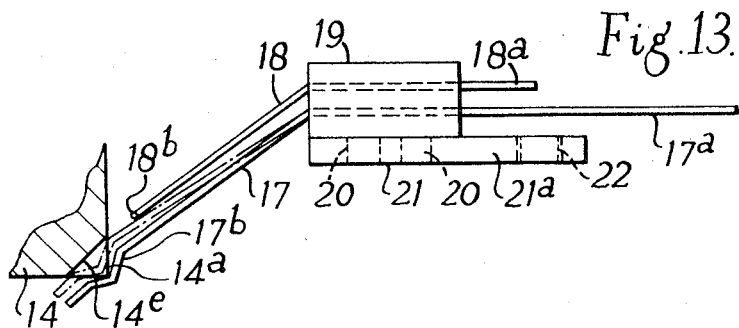

3,397,292
VISUAL PROGRAMMING APPARATUS
Jack Sutton, Fawley, Southampton, England, assignor to G. Stibbe & Company Limited, Leicester, England, a British company
Filed Sept. 21, 1966, Ser. No. 581,022
Claims priority, application Great Britain, Apr. 27, 1966, 18,329/66
19 Claims. (Cl. 200—6)

ABSTRACT OF THE DISCLOSURE

Programming apparatus for controlling a machine capable of sequentially performing a program of functions and comprising a plurality of individual elements for controlling switches adapted to influence the machine. Each element is rotatable about an axis to present one of a plurality of successive faces to a viewing reference plane. These faces are coded and distinguished from one another and from the faces of other elements, so that with the elements arranged in a grid-like assembly, they can be turned to present a visual pattern of faces representing a desired program.

---

Figure 1:
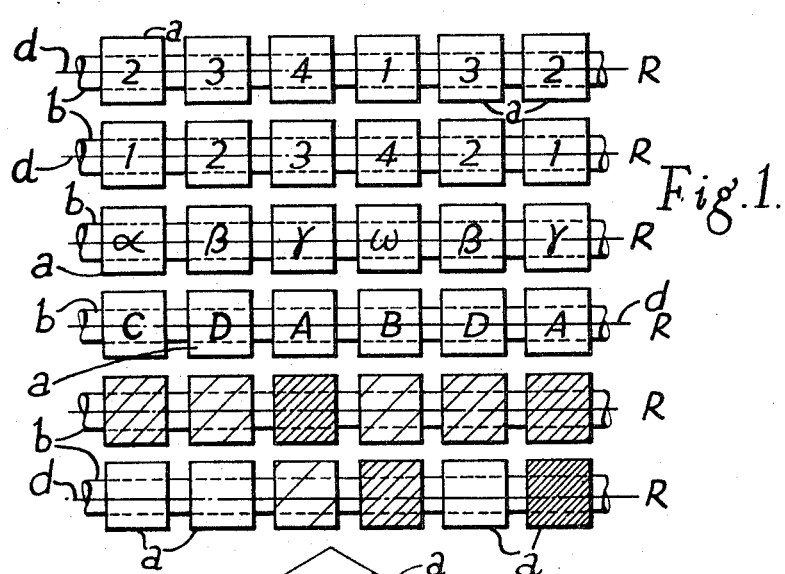

This invention appertains to programming means designed to dictate to a machine by feeding or storing into it predetermined information representing a programme of functions or operations required to be performed in a desired sequence by the said machine.

The term "machine" is used in this specification in its widest possible generic sense to include a mechanism or an apparatus of any appropriate character. Thus, whilst primarily intended for application to a knitting machine wherein knitting instruments are required to be operated and controlled for patterning purposes, the invention is by no means limited in this respect as it may be similarly applied to any analogous textile or other machine or even to a computer.

Heretofore, manually selectable programming means for such purposes have commonly comprised a rectangular grid-like or matrix-like plug board having provided therein rows of sockets into selected ones of which can be inserted plugs for the purpose of producing desired effects, e.g., short circuits or the pre-conditioning of circuits incorporating various electrical or/and electronic devices such, for instance, as relays, capacitors, filters, impedance elements, resistors, transistors, solid state or thermionic devices, amplifiers and so on. Albeit that some attempt is made to differentiate these plugs, nevertheless the operation of selecting them and plugging them in to accord with a predetermined pattern or arrangement is an inconvenient and tedious one and one which, in the result, rarely displays a direct visual layout of what is required.

The object of the present invention is to provide for the purposes specified an improved and particularly simple programming device designed to be easily manipulated and to present a direct visual layout of a predetermined pattern or arrangement of the information required to be fed or stored into an automatic machine with which the said device is associated.

Thus, the aim is to provide a substitute for a plug board which will obviate the aforementioned disadvantages.

The programming device constituting this invention comprises an assemblage of individual pre-setting elements arranged in regular order, each of said elements being rotatable about an axis through 360° and adapted to be selectively turned to and held in different angular positions in which it presents to view at a viewing location respectively different and readily distinguishable facial portions and, associated with these presetting elements, control devices so arranged that whenever and as a consequence of a presetting element being turned into a selected angular position to display to the operator a recognisable face, a control device is influence in a predetermined manner to assist in preconditioning the automatic machine to subsequently function as required. That is to say, turning movements selectively imparted to presetting elements of the assemblage in accordance with a prearranged plan not only produces a direct visual pattern or layout of element faces representing the desired programme, but also as a matter of course preconditions the machine by feeding into and storing within it the necessary predetermined programming information.

Where, as is principally the intention, the automatic machine to be programmed includes circuitry incorporating various electrical or/and electronic devices as aforesaid, each of the presetting elements of the improved programming device may be in the nature of a switch-actuator. In this case, each such element may advantageously be provided with as many different switch-actuating portions or formations—one to a switch—as there are respectively different faces for selectively turning into a display position at the front of the programming device.

Alternatively, however, the presetting elements may be in the form of valve actuators adapted, when turned, to appropriately influence fluid pressure systems, viz., liquid or gaseous. Or the elements may function as trips, latches or analogous devices for initiating or effecting purely mechanical movements.

The relatively angularly disposed faces of each presetting element may be coded, i.e., distinguished both from one another and from the faces of adjacent elements, by any appropriate visually arresting get-up.

In the preferred embodiment of the invention, each of the presetting elements is of cube or mainly cube form having four flat faces relatively arranged at right angles It is also possible to employ elements of hexagonal, octagonal or any other suitable polygonal form.

Figure 2:
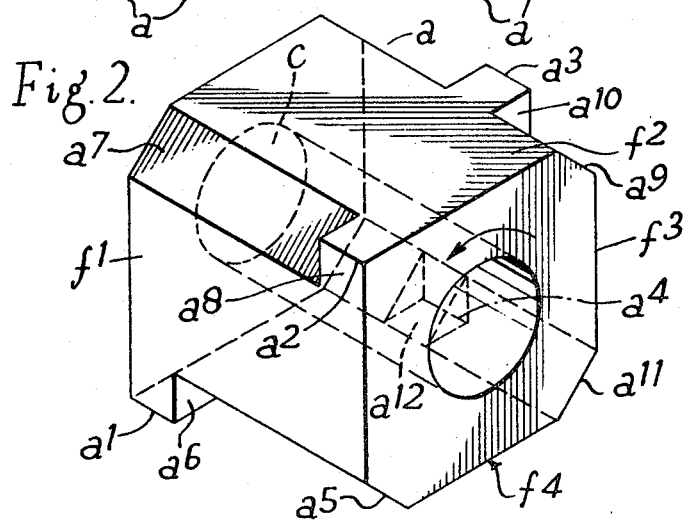
Figure 3:
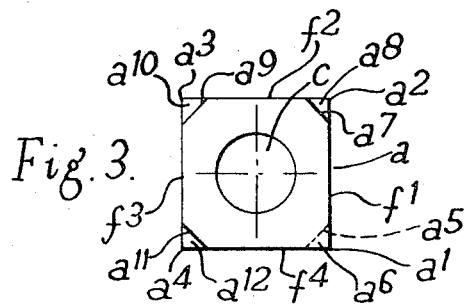
Figure 4:
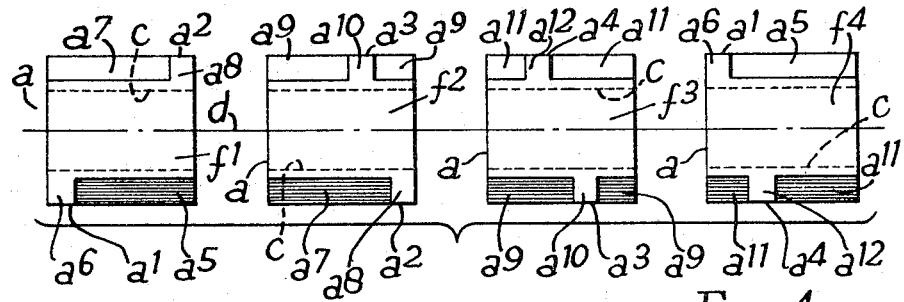
Figure 5:
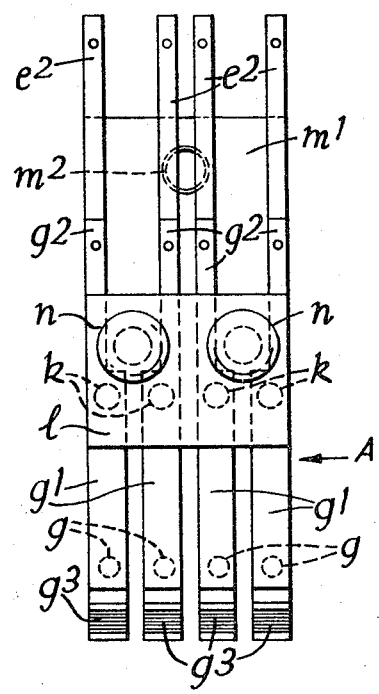
Figure 9:
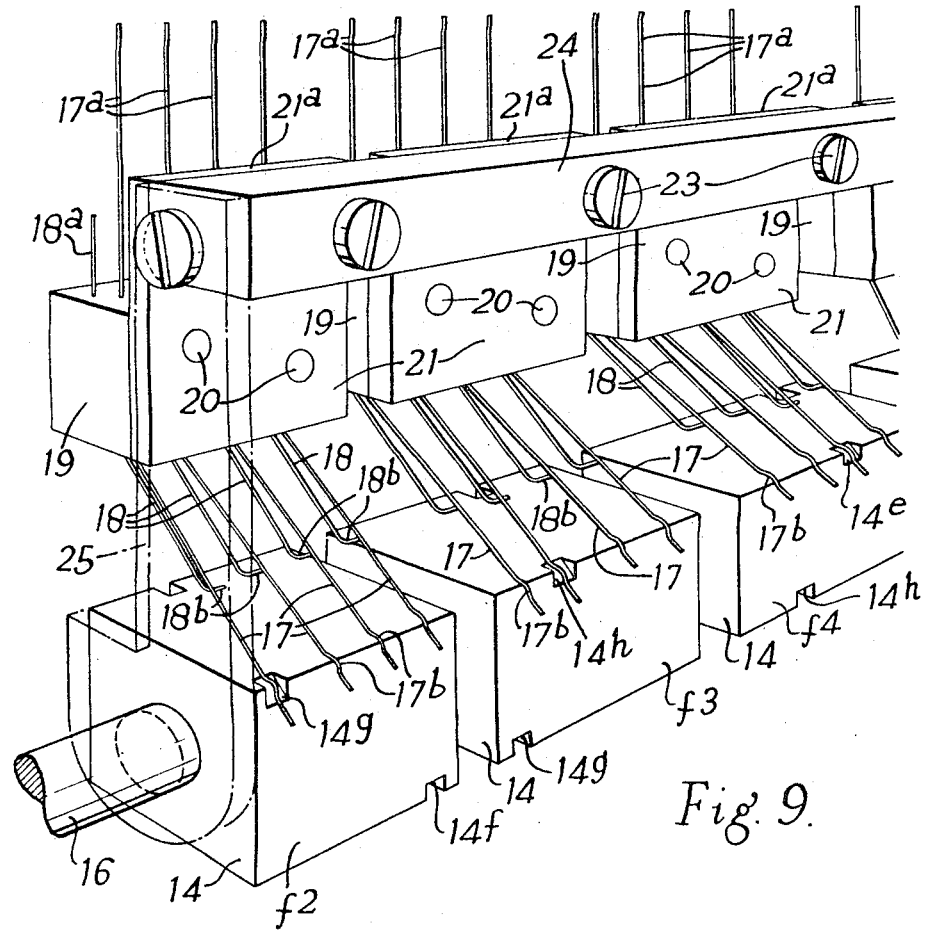
Figure 10:
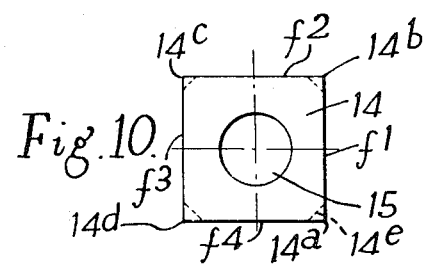

In order that the invention may be more clearly understood and readily carried into practical effect, specific examples thereof will now be described with reference to the accompanying drawings, wherein:

FIGURE 1 is a purely diagrammatic representation, as viewed from the front, of a comparatively small grid-like assemblage of presetting elements in the form of switch-actuator cubes, FIGURE 2 is a perspective view of one possible form of one of the switch-actuator cubes per se, FIGURE 3 is an end view of the same, FIGURE 4 comprises the four faces of the said cube shown in exploded form for convenience and in the sequence they are presented to view when the cube is turned in the direction of the arrow in FIGURE 2, FIGURE 5 is an elevational view of a set of switch contacts for combination with, and adapted to be actuated by, a switch-actuator cube such as that depicted in FIGURES 2, 3 and 4, FIGURE 6 is a side view of the same contact set a seen in the direction of the arrow A in FIGURE 5, FIGURE 7 is a view corresponding to FIGURE 5 o a complete assemblage comprising a contact set and an associated switch-actuator cube, FIGURE 8 is a side view of two superimposed such assemblages, FIGURE 9 is a general perspective view of part of an assembly of contact sets and cubes constituting a second example of the invention hereinafter to be described, FIGURE 10 is an end view of one of the switch-actuator cubes in such assembly, FIGURE 11 is a view similar to FIGURE 4 separately showing the four faces of the cube depicted in FIGURES 9 and 10, FIGURE 12 is an elevational view similar to FIGURE 5, of a contact set for association with the alternative form of switch-actuator cube illustrated in FIGURES 9, 10 and 11, and FIGURE 13 is a side view of the said contact set as seen in the direction of the arrow B in FIGURE 12.

Like parts are designated by similar reference characters throughout the drawings. Except in FIGURE 1, the various contact sets and cubes are drawn to a substantially enlarged scale.

Referring to FIGURE 1, the programming device therein illustrated comprises a plurality of parallel rows R of pre-setting elements in the form of switch-actuator cubes $a$ which latter are so disposed as to provide straight-line series thereof intersecting one another at right angles. Preferably, and as shown, the device includes a grid-like bank of the cubes $a$ arranged in a square having in each horizontal row the same number of elements as in each vertical row. Thus, for example, in a limited programming device of small dimensions based, as in FIGURE 1, on a 6 x 6 assembly there will be thirty six switch-actuator cubes $a$ disposed in six horizontal and hence also six vertical rows each containing six of the cubes. Such an assembly can naturally be expanded to practically any size, according to requirements. For instance, in a 48 x 48 grid-like assembly, there would be 2304 cubes disposed in forty eight horizontal and forty eight vertical rows, and so on. For most practical purposes, a cube will be found to be the most satisfactory form of individual pre-setting element because as a matter of course it provides four faces $f^1$, $f^2$, $f^3$ and $f^4$ each of maximum area (see FIGURES 2, 3 and 4).

The cubes $a$ in each rectilinear row R are mounted for turning movements usually manually, about a common axis. For example, all of the cubes in each such row R may be mounted upon a common pivot rod $b$. Alternatively, each of the cubes may be mounted to turn on its own individual pivot, the pivots of all of the cubes in any one row being disposed in axial alignment. Moreover, although in FIGURE 1, the turning axes of the cubes $a$ are shown as extending horizontally, there is no limitation in this respect since the turning axes may, if desired, extend vertically through the vertical rows of cubes; whether the said axes are horizontal or vertical will depend upon the positioning of the switch contact sets in association with which the switch-actuator cubes are provided.

The four faces $f^1$, $f^2$, $f^3$ and $f^4$ of each cube $a$ are coded to distinguish them both from one another and from the faces of adjacent cubes in the assembly. Various examples of alternative codings are diagrammatically depicted in FIGURE 1. Thus, for instance, and especially for programming patterning mechanisms of knitting and analogous machines, such faces may be contrastingly coloured. Or, for other applications including computers, they may bear contrasting symbols such as letters, numerals, signs or emblems.

In the specific example illustrated in FIGURES 2-8, each switch-actuator cube $a$ is centrally bored right through at $c$ from end to end to enable it to be mounted on the appropriate pivot rod $b$. Each of the four edges $a^1$, $a^2$, $a^3$ and $a^4$ of the cube, which extend parallel to the axis $d$ of the bore $c$, is bevelled except at one location therealong which is left intact suchwise as to leave projecting from the bevel surface a switch-actuating formation of triangular shape in cross section or side elevation. Thus, the edge $a^1$ is bevelled at $a^5$, except at a location at one end of the cube $a$, so as to leave projecting from this bevel a pointed switch-actuating formation $a^6$. The edge $a^2$ is bevelled at $a^7$, except at a location at the opposite end of the said cube, so as to leave a protuberant switch-actuating formation $a^8$. Next, the edge $a^3$ is bevelled at $a^9$, except at a location between the opposite ends of the cube, such as to produce on this bevel a pointed switch-actuating formation $a^{10}$. Finally, the edge $a^4$ is bevelled at $a^{11}$, except at another location between the opposite ends of the cube $a$, so as to produce on the bevel $a^{11}$ a similar switch-actuating formation $a^{12}$. On each cube $a$ there are accordingly four switch-actuating formations $a^6$, $a^8$, $a^{10}$ and $a^{12}$, one projecting from each bevel surface, and these four formations are distributed at equal distances apart along the cube in the direction of its turning axis. That is to say, there is one switch-actuating formation at one end of the cube, another at the opposite end and two more spaced apart between the ends.

In the assembly diagrammatically illustrated in FIGURE 1, the various switch actuator cubes $a$ are shown plain, i.e., without any bevels and switch-actuating formations thereon. This is because the primary purpose of the figure is merely to show the general layout of the cubes and some of the alternative ways of coding them.

Figure 6:
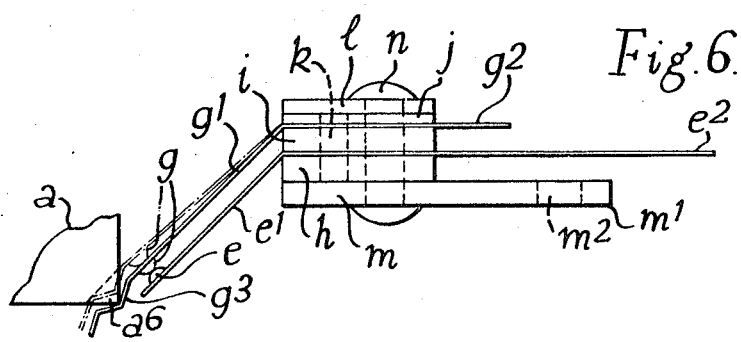

Each of the switch-actuator cubes $a$ in the example now being described is mounted adjacent to a set of four pairs of resilient electric contacts $e$ and $g$ which pairs are spaced apart at the same spacing as the switch-actuating formations $a^6$, $a^8$, $a^{10}$ and $a^{12}$ on the cube—with the contacts of each pair normally separated by the spring bias (see chain line position of contact $g$ in FIGURE 6). Consequently, if the cube $a$ were to be rotated through 360° in four successive steps each of 90° extent, the pairs of contacts, e.g., would be successively closed, the last closed pair opening again, however, as the cube is turned to close the next pair. But in practice, of course, the cubes are selectively turned to and fro to different positions according to the predetermined programme.

The contacts $e$ and $g$ of each pair are carried by two metallic leaves $e^1$ and $g^1$ respectively. The leaf $g^1$ is extended beyond the contact $g$ and is so formed at $g^3$ as to present a V-shaped detent adapted to be acted upon by the appropriate one of the switch-actuating portions $a^6$, $a^8$, $a^{10}$ and $a^{12}$. This specially shaped detent in the leaf $g^1$ of each pair of contacts may also be relied upon to exert upon the cube $a$, when turned, sufficient spring pressure to retain and hold it in position until turned again.

The leaves $e^1$ and $g^1$ are formed at $e^2$ and $g^2$ respectively with rearward extensions of respectively different lengths for connection of the contact set with electrical or/and electronic circuitry incorporated in or otherwise associated with an automatic machine. At a location between their opposite ends, the two metallic leaves of each contact set are firmly gripped between three rectangular pieces or layers $h$, $i$ and $j$ of any suitable plastic which are held together by a plurality of pegs $k$. The general effect of this construction is, therefore, that the metallic leaves $e^1$ and $g^1$ are embedded in a rectangular insulating block of laminated form serving to insulate the said leaves from one another. This block is clamped between suitably plated steel plates $l$ and $m$ through which extend the shanks of securing rivets $p$. The lower plate $m$, which is of greater thickness than the upper plate $l$, is rearwardly extended at $m^1$ to provide a carrier bracket. This rearwardly directed bracket $m^1$ of each contact set is drilled and tapped at $m^2$ to receive a screw $o$ (see FIGURES 7 and 8) by means of which the assembly is secured upon a mounting bar $p$. Also screwed to this bar, upon the front face thereof, is a laterally directed portion $q^1$ of a bearing plate $q$ which extends alongside the contact set and is drilled at its outer end to provide a bearing for a pivot rod $b$. Thus, in this example, a programming device comprises a vertical series of the mounting bars $p$ upon each of which is supported a predetermined number of the herein described contact sets arranged closely side by side. Usually the number of contact sets on each mounting bar will equal the number of such bars. In any event, a single pivot rod $b$ common to all of the contact sets of a horizontal series will extend through the respective bearing plates $q$ lying adjacent to these sets. On the pivot rod are mounted, for individual turning movements, all of the switch-actuator cubes *a* for association with the contact sets of the said horizontal series. As it so happens, the faces $f^3$ of both of the switch-actuator cubes shown in FIGURE 8 are presented for viewing at the front of the device. Also in this same figure the horizontal mounting bars *p* are shown arranged vertically one above another.

Now whilst for general convenience of description and illustration the first example of the invention just described has been concentrated upon pairs of contacts carried by metallic leaves, it will usually be preferred, for reasons of economy and ease of manufacture to provide simplified contact sets including switch wires, i.e., switches each in the form of a pair of inherently resilient wires adapted themselves to constitute the necessary contacts. Conveniently, such switches may normally be closed by virtue of the resilience forcing the wires together: in this case, a switch is open-circuited by forcibly separating its two wires. This is, of course, the reverse of the first described arrangement in which the contacts of each pair are normally held separated by the metallic leaves and are positively moved into contact with one another by the action of a protuberant switch-actuating portion of the relevant cube. Accordingly, switch-actuator cubes suitable for selectively operating such switch wires require to be of a modified form in which the edges of the cube are relied on to force switches open and recesses or notches provided in these edges permit switches to remain closed. The second example of the invention illustrated in FIGURES 9–13 embodies these features.

As will be seen in FIGURES 9, 10 and 11, each of the modified switch-actuator cubes, designated 14, is as in the first example bored right through at 15 to enable it to be mounted on a pivot rod 16. Each of the four edges 14*a*, 14*b*, 14*c* and 14*d* of the cube in this second example is left intact except at one location therealong which is notched or recessed suchwise as to form on the cube a short bevel. On each cube 14 there are accordingly four switch-controlling bevels 14*e*, 14*f*, 14*g* and 14*h*—one subtending each such edge. These four bevels are distributed at equal distances apart along the cube 14 in the direction of its turning axis. That is to say, there is one switch-controlling bevel at one end of the cube, another at the opposite end and two more spaced apart between the ends. Thus, as seen in FIGURES 10 and 11, the edge 14*a* is notched or recessed between the ends of the cube so as to form the bevel 14*e*; the edge 14*b* is similarly notched or recessed at one end of the cube 14 to form the bevel 14*f*; the edge 14*c* is notched or recessed at the opposite end of the cube to form the bevel 14*g* and the edge 14*d* is notched or recessed between the cube ends to form the bevel 14*b*.

Each of the modified switch-actuator cubes 14 just described is turnably mounted adjacent to a contact set comprising four pairs of resilient switch wires 17 and 18 incorporated in a moulded insulating block 19 of a plastic. The block 19 of each contact set has moulded integrally therewith mounting spigots 20 by means of which the said block is mounted upon a suitably plated steel plate 21. A portion 21*a* of each plate 21 extends rearwardly from the corresponding insulating block 19 and thus constitutes a carrier bracket which is drilled and tapped at 22 to receive a screw 23 whereby the set is attached to a mounting bar 24 (see FIGURE 9). At suitable intervals along it the bar 24 has attached thereto bearing plates 25 adapted to support a pivot rod 16.

The switch wires 17 are longer than the companion wires 18, the extensions 17*a* and 18*a* thereof being adapted for connection of the contact or switch sets with electrical or/and electronic circuitry. The wires, e.g., of about 0.016″ diameter may advantageously be of Phosphor bronze suitably alloy clad, although there are no limitations in these respects. In any event, the outer end of the longer switch wire 17 of each pair is so shaped as to provide a detent 17*b* enabling it to cooperate with a corner of the relevant cube 14. The outer end of the shorter wire 18, on the other hand, is bent laterally at 18*b* to provide a contact portion over-lying the wire 17. Normally the wires 17, 18 of a pair are kept apart to maintain the switch open whenever a corner of the cube engages the detent 17*b* of the wire 17, as shown in full lines in FIGURE 13. But whenever a notch or recess in the cube comes opposite to the outer end of a switch wire 17, the latter has presented to it a bevel on the cube and is thus enabled to contact the portion 18*b* of the wire 18, thereby permitting closure of the switch (see the chain-line position of the wire 17 in FIGURE 13).

Merely for convenience of illustration in FIGURE 9, the switch-actuator cubes 14 and the associated contact sets including the pairs of switch wires 17, 18 are shown vertically disposed and as viewed from their undersides; in practice, the units will usually (but not necessarily always) be horizontally disposed as shown in FIGURE 13.

The constructional details of the improved programming device may, however, be varied. Moreover, the said device, which is a digital system, may either be built into the machine with which it is associated or be mounted upon a support or framework separate from the machine.

One of the envisaged uses of the device is to program a patterning mechanism of a knitting machine to produce colour jacquard work. In this case the four different faces $f^1$, $f^2$, $f^3$ and $f^4$ of each switch actuator cube (*a* or 14) may be contrastingly coloured, the arrangement being such that the visual layout produced by selective manipulation of the various cubes in the assembly is "analogue" in appearance although the system is, in fact, digital as aforesaid.

To enable a patterning mechanism to be pre-set to produce either 2-, 3- or 4-colour jacquard effects, with the aid of a programming device in which each of the cubes have four contrastingly coloured faces, it is necessary to provide in conjunction with the device additional switch means operable to connect up the circuitry in the machine in different permutations.

I claim:
1. A programming apparatus for prearranging the operation of a machine by controlling the feeding to the machine of information representing a program of functions of operations required to be performed by the machine comprising: an assemblage of individual presetting elements arranged in a regular order, with each element being positioned adjacent a reference plane, each said element having a plurality of relatively angular displacement faces, and being mounted for rotational movement independently of the other elements of the assemblage about an axis to expose any one of its faces by placing that face into the said reference plane, and a control means associated with each presetting element for determining any one of a plurality of functions of operation of the machine, the particular function determined by said control means depending upon the rotational position of its associated presetting element, whereby when the said elements of the assemblage have been rotated to positions so that their associated control means retermine functions of operation of the machine in accordance with a prearranged plan, the exposed faces of the elements provide in said reference plane a visual pattern representing said prearranged operation of the machine.

2. Programming apparatus according to claim 1 wherein said elements are mounted for 360° of rotational movement.

3. A programming apparatus for prearranging the operation of a machine having circuitry incorporating electrical devices by controlling the feeding to the machine of electrical information representing a program of functions of operations required to be performed by the machine comprising: an assemblage of individual switch-actuators arranged in a plurality of rectilinear rows so disposed as to provide straight-line series of the switch actuators intersecting one another at right angles each switch actuator being positioned adjacent to a ref erence plane, each said switch actuator having a plurality of relatively angular disposed faces and being mounted for rotational movement independently of the other switch actuators of the assemblage about an axis to expose any one of its said faces by placing that face into said reference plane, and a set of electrical switches associated with each switch actuator for determining any one of a plurality of functions of operation of the machine, the particular functions of the machine determined by the said set of switches depending upon the rotational position of its associated switch actuator, whereby, when the said switch actuators of the assemblage have been rotated to positions so that their associated sets of switches determine functions of operation of the machine in accordance with a prearranged plan, the exposed faces of these switch actuators provide in said reference plane a visual pattern representing said prearranged operation of the machine.

4. A programming apparatus according to claim 3 wherein said elements are mounted for 360° of rotational movement.

5. Programming apparatus according to claim 3, wherein each switch actuator includes one switch actuating formation for each switch of its associated set of switches and for each one of its faces which is movable into said reference plane.

6. Programming apparatus according to claim 3, which includes a bank of the switch-actuators arranged in a square having in each horizontal row the same number of actuators as in each vertical row.

7. Programming apparatus according to claim 3, wherein the relatively angularly disposed faces of each switch-actuator are coded and distinguished from one another and from the faces of adjacent actuators by virtue of being contrastingly coloured or/and bearing contrasting symbols such as letters, numerals, signs or emblems.

8. Programming apparatus according to claim 3, wherein each of the switch-actuators is in the form of a cube having four flat faces relatively disposed at right angles to one another, the edges of the cube between these faces being so formed as to provide the cube with formations for controlling the said set of switches associated with that cube.

9. Programming apparatus according to claim 8, wherein each cube is centrally bored right through from end to end, the four edges of the cube which extend parallel to the bore axis being bevelled except at desired locations therealong where these edges are left intact so as to leave projecting from the bevels switch-actuating formations of triangular shape.

10. Programming apparatus according to claim 9, wherein each cube has thereon four of the switch-actuating formations, one projecting from each bevelled edge, these four formations being uniformly distributed along the cube in the direction of its rotational axis.

11. Programming apparatus according to claim 10, wherein each switch-actuating formation on each cube acts on a switch of its associated set of switches to close the same, whereas each bevel on the said cube permits remaining switches of the set to open.

12. Programming apparatus according to claim 8, wherein each cube is centrally bored right through from end to end, the four edges of the cube which extend parallel to the bore axis being left intact except at desired locations therealong where the edges are notched to form on the cube switch-controlling surfaces.

13. Programming apparatus according to claim 12, wherein each of the four edges of each cube is left intact except at one location therealong which is notched, the four notches and hence also the four resulting switch-controlling surfaces being uniformly distributed along the cube in the direction of its rotating axis.

14. Programming apparatus according to claim 13, wherein each of the said four edges of each cube acts on the switches of its associated set of switches to open the same, except one switch of the set which is permitted to close by the said switch-controlling surface on the cube defined by a notch thereon.

15. Programming apparatus according to claim 3, wherein the switch-actuators in each rectilinear row are mounted for rotational movements about a common pivot rod and are manually turnable.

16. Programming apparatus according to claim 15, the associated set of switches of each switch-actuator cube including a set of adjacently disposed pairs of resilient switch members mounted adjacent to its associated cube, the free end of one such member of each pair extending beyond the other, and said extension being so shaped as to present a detent adapted to be acted upon and moved by the cube against the spring bias to open or close the switch, as the case may be.

17. Programming apparatus according to claim 16, wherein the switch members of each pair consist of lengths of spring wire adapted themselves to constitute switch contacts.

18. Programming apparatus according to claim 16, wherein the members of each pair consist of inherently springy metallic leaves carrying contacts.

19. Programming apparatus according to claim 16, wherein each pair of switch members extends through insulating material having combined therewith a bracket secured on a mounting bar common to several such sets, the said bar also serving to support bearing plates for a pivot rod about which corresponding switch-actuator cubes are mounted to rotate.

References Cited

UNITED STATES PATENTS 2,963,628   12/1960   Ostland _____ 200—38

LARAMIE E. ASKIN, *Primary Examiner.*

J. R. SCOTT, *Assistant Examiner.*